US012087518B2

(12) United States Patent
Tsai et al.

(10) Patent No.: US 12,087,518 B2
(45) **Date of Patent: *Sep. 10, 2024**

(54) KEYBOARD

(71) Applicant: DARFON ELECTRONICS CORP., Taoyuan (TW)

(72) Inventors: Po-Wei Tsai, Taoyuan (TW); Sheng-Yun Yang, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,487

(22) Filed: Jul. 17, 2023

(65) Prior Publication Data

US 2024/0038462 A1 Feb. 1, 2024

Related U.S. Application Data

(60) Provisional application No. 63/436,851, filed on Jan. 3, 2023, provisional application No. 63/392,481, filed on Jul. 26, 2022.

(30) Foreign Application Priority Data

Jun. 16, 2023 (TW) ................................ 112122521

(51) Int. Cl.
*H01H 3/12* (2006.01)
*F21V 8/00* (2006.01)
(Continued)

(52) U.S. Cl.
CPC ........ *H01H 13/7065* (2013.01); *H01H 13/83* (2013.01); *H01H 2219/054* (2013.01)

(58) Field of Classification Search
CPC ............................ G06F 3/0202; H01H 13/125
(Continued)

(56) References Cited

U.S. PATENT DOCUMENTS 9,040,856 B2 * 5/2015 Chen .................... H01H 13/702 200/310
10,984,969 B1 4/2021 Wang
(Continued)

FOREIGN PATENT DOCUMENTS

CN 109300726 A 2/2019
CN 212750667 U 3/2021
(Continued)

OTHER PUBLICATIONS

Ly Corporation, iRocks K71M RGB backlit mechanical keyboard unboxing, 4Gamers, Apr. 10, 2021, https://today.line.me/tw/v2/article/p58yLw; Apr. 10, 2021.

*Primary Examiner* — Keith G. Delahoussaye
(74) *Attorney, Agent, or Firm* — Winston Hsu

(57) ABSTRACT

A keyboard includes a plurality of keyswitches, a plastic baseplate, and a membrane circuit board. Each keyswitch has a keycap, a lifting mechanism and an elastic member. The lifting mechanism is movably connected to the keycap. The elastic member abuts against the keycap. The plastic baseplate has a first hole formed corresponding to each elastic member and has a connecting structure corresponding to each lifting mechanism. The connecting structure is movably connected to the lifting mechanism to make the keycap movable relative to the plastic baseplate. The membrane circuit board is disposed under the plastic baseplate. Each elastic member passes through the first hole on the plastic baseplate to be disposed on the membrane circuit board. When the keycap is pressed, the elastic member deforms downward to trigger the membrane circuit board. When the keycap is released, the elastic member returns the keycap to its original position.

14 Claims, 7 Drawing Sheets

(51) Int. Cl.

| | |
|---|---|
| ***G06F 3/02*** | (2006.01) |
| ***H01H 13/7065*** | (2006.01) |
| ***H01H 13/83*** | (2006.01) |

(58) Field of Classification Search
USPC ............................ 200/310; 362/23.03, 23.04
See application file for complete search history.

(56) References Cited

U.S. PATENT DOCUMENTS

| | | | | |
|---|---|---|---|---|
| 2008/0151526 | A1* | 6/2008 | Miyashita | G01D 11/28 362/23.04 |
| 2010/0259485 | A1* | 10/2010 | Chuang | G02B 6/006 345/173 |
| 2010/0288615 | A1* | 11/2010 | Mafune | H01H 13/83 200/310 |
| 2018/0149797 | A1* | 5/2018 | Chen | G06F 3/0202 |
| 2020/0043681 | A1* | 2/2020 | Chen | G06F 3/0213 |
| 2021/0082642 | A1 | 3/2021 | Ho | |

FOREIGN PATENT DOCUMENTS

| | | | |
|---|---|---|---|
| TW | 201426802 | A | 7/2014 |
| TW | 201804501 | A | 2/2018 |
| TW | 201837945 | A | 10/2018 |
| TW | 201916086 | A | 4/2019 |
| TW | M605371 | U | 12/2020 |
| TW | M627927 | U | 6/2022 |

* cited by examiner

KEYBOARD

CROSS REFERENCE TO RELATED APPLICATIONS

This application claims the benefit of U.S. Provisional Application No. 63/392,481, filed on Jul. 26, 2022. Further, this application claims the benefit of U.S. Provisional Application No. 63/436,851, filed on Jan. 3, 2023. The contents of these applications are incorporated herein by reference.

BACKGROUND OF THE INVENTION

1. Field of the Invention

The present invention relates to a keyboard, and more specifically, to a keyboard having a plastic baseplate formed thereon integrally with a connecting structure to connect a lifting mechanism.

2. Description of the Prior Art

A keyboard, which is the most common input device, could be found in variety of electronic apparatuses for users to input characters, symbols, numerals and so on. Furthermore, from consumer electronic products to industrial machine tools, they are all equipped with a keyboard for performing input operations.

With development of technology and rise of environmental awareness, the keyboard design has gradually developed in a thinner and more environmentally friendly manner. However, a traditional keyboard usually utilizes a heavy metal baseplate to connect plural scissor-type lift mechanisms (about 90) for supporting keycaps of the keyboard to move up and down relative to the metal baseplate. When the keyboard is recycled, it takes a lot of time to separate the scissor-type lift mechanisms from the metal baseplate, so as to reduce the recyclability of the keyboard. Furthermore, the metal baseplate is also disadvantageous to the thinning design of the keyboard.

In addition, users pay much more attention to visual effect of keyboard except basic input function while choosing keyboard. So far a backlight keyboard has been developed. A conventional backlight design involves disposing a plurality of light emitting diodes corresponding to each keyswitch under the baseplate. As such, the light emitting diode can emit light to symbols on the keycap of the keyswitch for generating the symbol lighting effect. However, since light emitted upward by the light emitting diode would be incident to the keyswitch directly, it may cause the problem that the symbols on the keyswitch are too bright, so as to influence the brightness uniformity and the symbol lighting effect of the keyswitch.

SUMMARY OF THE INVENTION

The present invention provides a keyboard including a plurality of keyswitches, a plastic baseplate, and a membrane circuit board. Each keyswitch has a keycap, a lifting mechanism and an elastic member. The lifting mechanism is movably connected to the keycap, and the elastic member abuts against the keycap. The plastic baseplate has a first hole formed corresponding to each elastic member and forms a connecting structure integrally corresponding to each lifting mechanism, wherein the connecting structure is movably connected to the lifting mechanism to make the keycap movable relative to the plastic baseplate. The membrane circuit board is disposed under the plastic baseplate. Each elastic member passes through the first hole on the plastic baseplate to be disposed on the membrane circuit board. When the keycap is pressed, the elastic member deforms downward to trigger the membrane circuit board. When the keycap is released, the elastic member returns the keycap to its original position.

The present invention further provides a keyboard including a plurality of keyswitches, a plastic baseplate, and a membrane circuit board. Each keyswitch has a keycap, a lifting mechanism and an elastic member. The lifting mechanism is movably connected to the keycap, and the elastic member abuts against the keycap. The plastic baseplate has a first hole formed corresponding to each elastic member, wherein the lifting mechanism is movably connected to the plastic baseplate to make the keycap movable relative to the plastic baseplate. The membrane circuit board is disposed under the plastic baseplate and has a switch contact corresponding to each elastic member. Each elastic member passes through the first hole on the plastic baseplate to be disposed on the membrane circuit board and has an actuating pillar extending toward the switch contact. When the keycap is pressed, the elastic member deforms to drive the actuating pillar to trigger the switch contact. When the keycap is released, the elastic member returns the keycap to its original position.

The present invention further provides a keyboard including a plurality of keyswitches, a membrane circuit board, and a plastic baseplate. Each keyswitch has a keycap, a lifting mechanism and an elastic member. The lifting mechanism is movably connected to the keycap, and the elastic member abuts against the keycap. The membrane circuit board has at least one light emitting diode corresponding to the keyswitch. The at least one light emitting diode is located on at least one side of the elastic member and emitting light to the keycap. The plastic baseplate is disposed on the membrane circuit board. The plastic baseplate has a first hole formed corresponding to the elastic member and has an avoiding hole corresponding to at least one light emitting diode for containing the at least one light emitting diode, wherein the elastic member passes through the first hole to be disposed on the membrane circuit board, and the lifting mechanism is movably connected to the plastic baseplate to make the keycap movable relative to the plastic baseplate. When the keycap is pressed, the elastic member deforms to trigger the membrane circuit board. When the keycap is released, the elastic member returns the keycap to its original position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
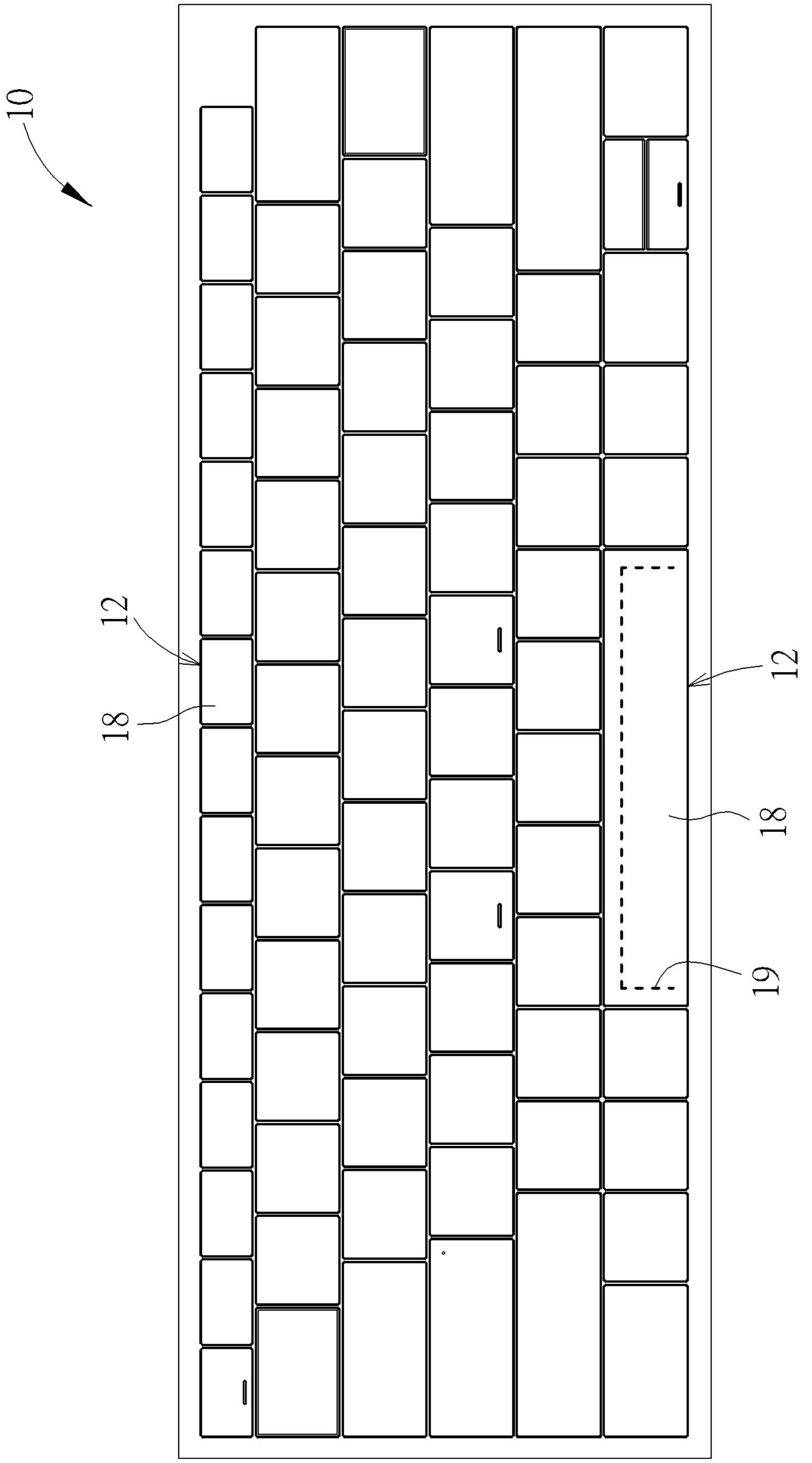
FIG. 1 is a top view of a keyboard according to an embodiment of the present invention.

The present invention winnow be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to scale and the configuration of each component (e.g., amount, forming positions and sizes of hooks, ink layers, optical microstructure and symbols) in the drawings is merely illustrative, not presenting an actual condition of the embodiments.

Figure 2:
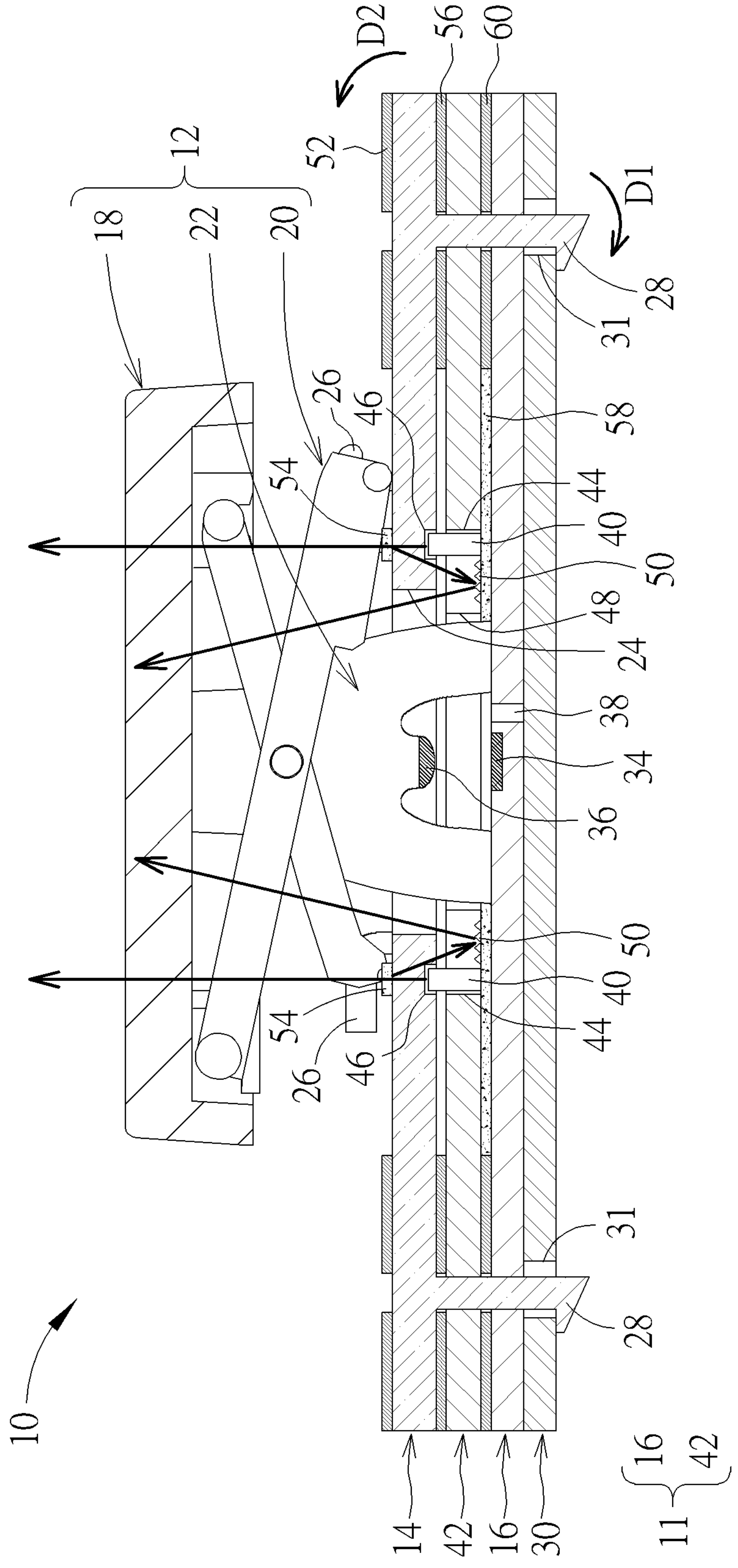
FIG. 2 is a cross-sectional diagram of the keyswitch in FIG. 1.

Please refer to FIG. 1 and FIG. 2. FIG. 1 is a top view of a keyboard 10 according to an embodiment of the present invention. FIG. 2 is a cross-sectional diagram of the keyswitch 10 in FIG. 1. The keyswitch 10 could be preferably applied to a foldable electronic apparatus composed of an upper cover and a lower casing or an electronic apparatus having a keyswitch input function (e.g., a notebook, but not limited thereto) for a user to perform desired input operations. As shown in FIG. 1 and FIG. 2, the keyboard 10 includes a plurality of keyswitches 12, a baseplate 14, and a membrane circuit board 16. Each keyswitch 12 has a keycap 18, a lifting mechanism 20, and an elastic member 22. The baseplate 14 has a first hole 24 formed corresponding to each elastic member 22, and the membrane circuit board 16 is disposed under the baseplate 14. The lifting mechanism 20 could be preferably a scissor-type lifting mechanism (but not limited thereto, meaning that the present invention could also adopt other lifting mechanisms, such as a butterfly-type lifting mechanism) and is movably connected to the keycap 18 for supporting the keycap 18 to move up and down relative to the baseplate 14, so that the user can perform input operations. The elastic member 22 abuts against the keycap 18 and passes through the corresponding first hole 24 on the baseplate 14 to be disposed on the membrane circuit board 16. Via the aforesaid design, when the keycap 18 is pressed by an external force, the elastic member 22 deforms to trigger the membrane circuit board 16 for generating a corresponding keyswitch signal, so that the keyboard 10 can execute a corresponding input function. On the other hand, when the external force is released, the elastic force of the deformed elastic member 22 can return the keycap 18 to its original position for generating the automatic returning effect, so that the user can perform subsequent pressing operations.

Figure 3:
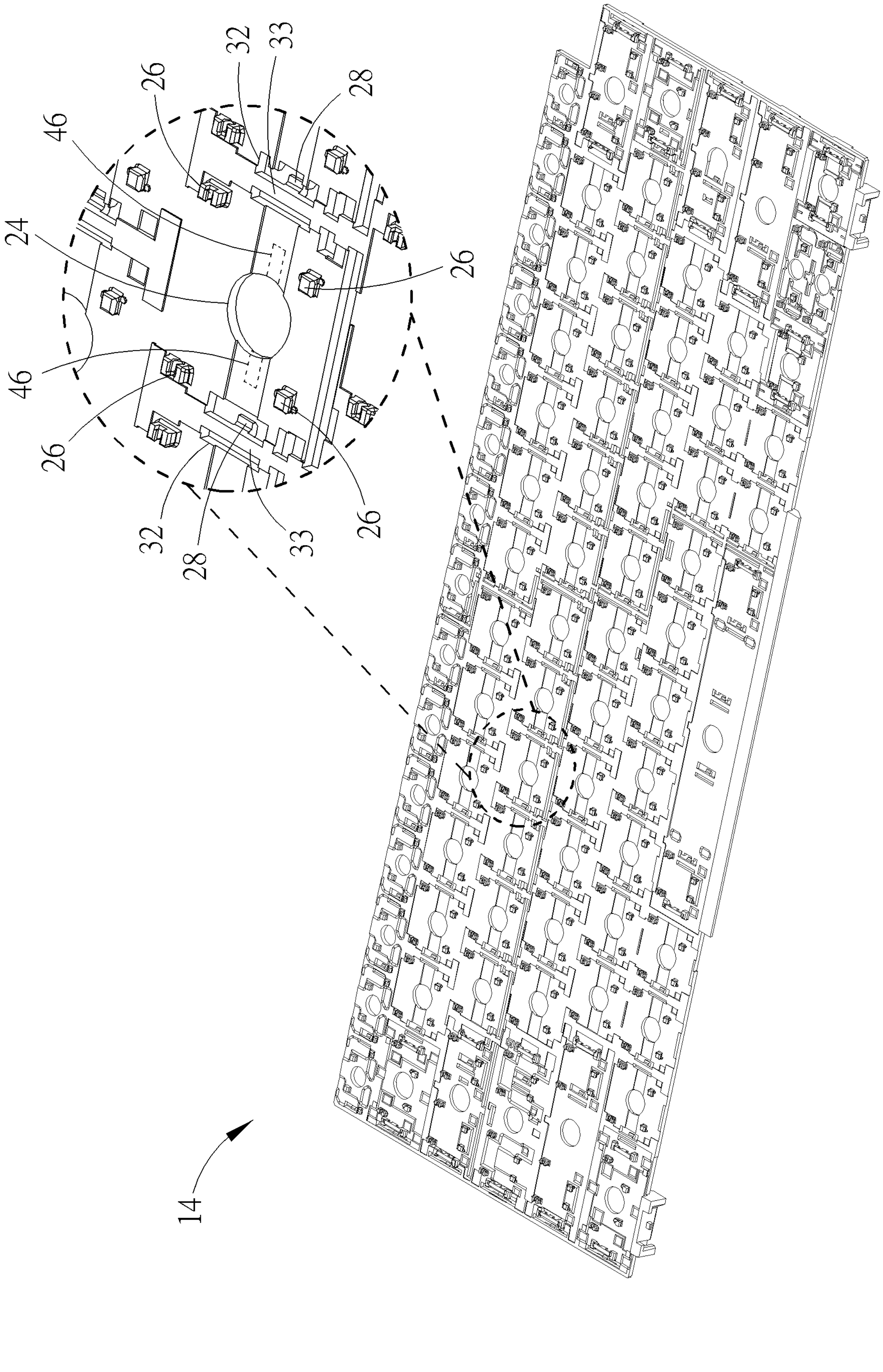
FIG. 3 is a diagram of a baseplate in FIG. 2.

More detailed description for the structural design of the baseplate 14 is provided as follows. Please refer to FIG. 1, FIG. 2 and FIG. 3. FIG. 3 is a diagram of the baseplate 14 in FIG. 2. As shown in FIG. 2 and FIG. 3, the baseplate 14 can preferably adopt a plastic injection molding process to form a transparent plastic baseplate. The baseplate 14 has at least one connecting structure 26 (four corresponding to the lifting mechanism 20 of the keyswitch 12 as shown in FIG. 3, but not limited thereto) corresponding to each lifting mechanism 20 in an integral forming manner. The connecting structure 26 is movably connected to the lifting mechanism 20 (the related description for the connection design of the connecting structure 26 is commonly seen in the prior art and omitted herein), so that the keycap 18 can move up and down relative to the baseplate 14 for the user to perform subsequent input operations. In this embodiment, a plurality of hooks 28 (preferably more than forty to improve the assembly strength of the baseplate 14, but not limited thereto) extends downward from the baseplate 14 in an integral forming manner. As such, the plurality of hooks 28 can pass through the membrane circuit board 16 to be engaged with a plurality of engaging hole structures 31 formed on a holding baseplate 30 of a computer device (not shown in the figure, such as a notebook computer), so as to make the keyboard 10 detachably mounted on the computer device.

To be more specific, as shown in FIG. 2, when the user wants to perform the assembly operation of the keyboard 10, the user just needs to press the keyboard 10 downward to make the plurality of hooks 28 engaged with the plurality of engaging hole structures 31 in an engaging direction D1, so as to complete the assembly operation of the keyboard 10 being mounted on the holding baseplate 30 quickly and conveniently. On the other hand, when the user wants to perform the disassembly operation of the keyboard 10, the user just needs to pull the baseplate 14 toward a disengaging direction D2 (opposite to the engaging direction D1), so that the plurality of hooks 28 can be disengaged from the plurality of engaging hole structures 31 in the disengaging direction D2. Accordingly, the baseplate 14 can be detached from the holding baseplate 30 together with the keyswitch 12 for subsequent maintenance or recycling. To be noted, as shown in FIG. 3, the baseplate 14 could have a hole 32 formed corresponding to the hook 28, and a rib 33 could be suspended and formed in the hole 32 and could be connected to the hook 28. As such, the present invention can enhance the elasticity of the hook 28 via the rib suspending design to help the user complete the engaging operation of the hook 28 quickly and effortlessly, so as to further improve the assembly and disassembly convenience of the baseplate 14.

As for the recyclability of the keyboard 10, as shown in FIG. 1, at least one of the plurality of keyswitches 12 on the keyboard (only the keyswitch 12 located at a bottom side of the keyboard (i.e., Space key) is described as an example, and the related description for the other keyswitches with metal rods could be reasoned by analogy) could further include at least one metal rod 19 (only one shown in FIG. 1 and depicted by a dotted line, but not limited thereto, meaning that the number of the metal rods could depend on the practical application of the keyboard 10). The metal rod 19 is disposed under the keycap 18 and adopts a linkage rod design commonly applied to a keyboard for enhancing the structural synchronization and operational sensitivity of the keyboard 10 when pressing longer keys (such as multiple-sized keys). As for the related description for the structural design of the metal rod 19 and the connection design between the metal rod 19 and the keycap 18, it is commonly seen in the prior art and omitted herein. In addition to the aforesaid metal rod 19, the remaining structures of the plurality of keyswitches 12 of the keyboard 10 (e.g., the keycap 18, the lifting mechanism 20, and the elastic member 22, etc.) are all made of recyclable plastic material, so that the keyboard 10 can be made of plastic material in a high proportion (e.g., 95%). In such a manner, after the baseplate 14 is disassembled from the holding baseplate 31 and the metal rod 19 is removed, the recycling operation of the keyboard 10 can be completed quickly, thereby greatly improving the recyclability of the keyboard 10. Moreover, the plastic baseplate design is also advantageous to the thinning design of the keyboard 10.

Furthermore, the keyboard 10 could preferably adopt a pillar triggering design (but not limited thereto). For example, as shown in FIG. 2, the membrane circuit board 16 could have a switch contact 34 corresponding to the elastic member 22, and an actuating pillar 36 (e.g., a conductive carbon pillar, etc.) extends from the elastic member 22 toward the switch contact 34. As such, when the keycap 18 is pressed, the elastic member 22 can deform to trigger the switch contact 34 via the actuating pillar 36 for generating a corresponding keyswitch signal, so that the keyboard 10 can perform a desired input function. Moreover, as shown in FIG. 2, the membrane circuit board 16 could have a vent hole 38 corresponding to the elastic member 22. Accordingly, when the keycap 18 is pressed to cause deformation of the elastic member 22, air inside the elastic member 22 can be discharged out of the elastic member 22 through the vent hole 38, so as to prevent elasticity of the elastic member 22 from being reduced due to the air.

Figure 4:
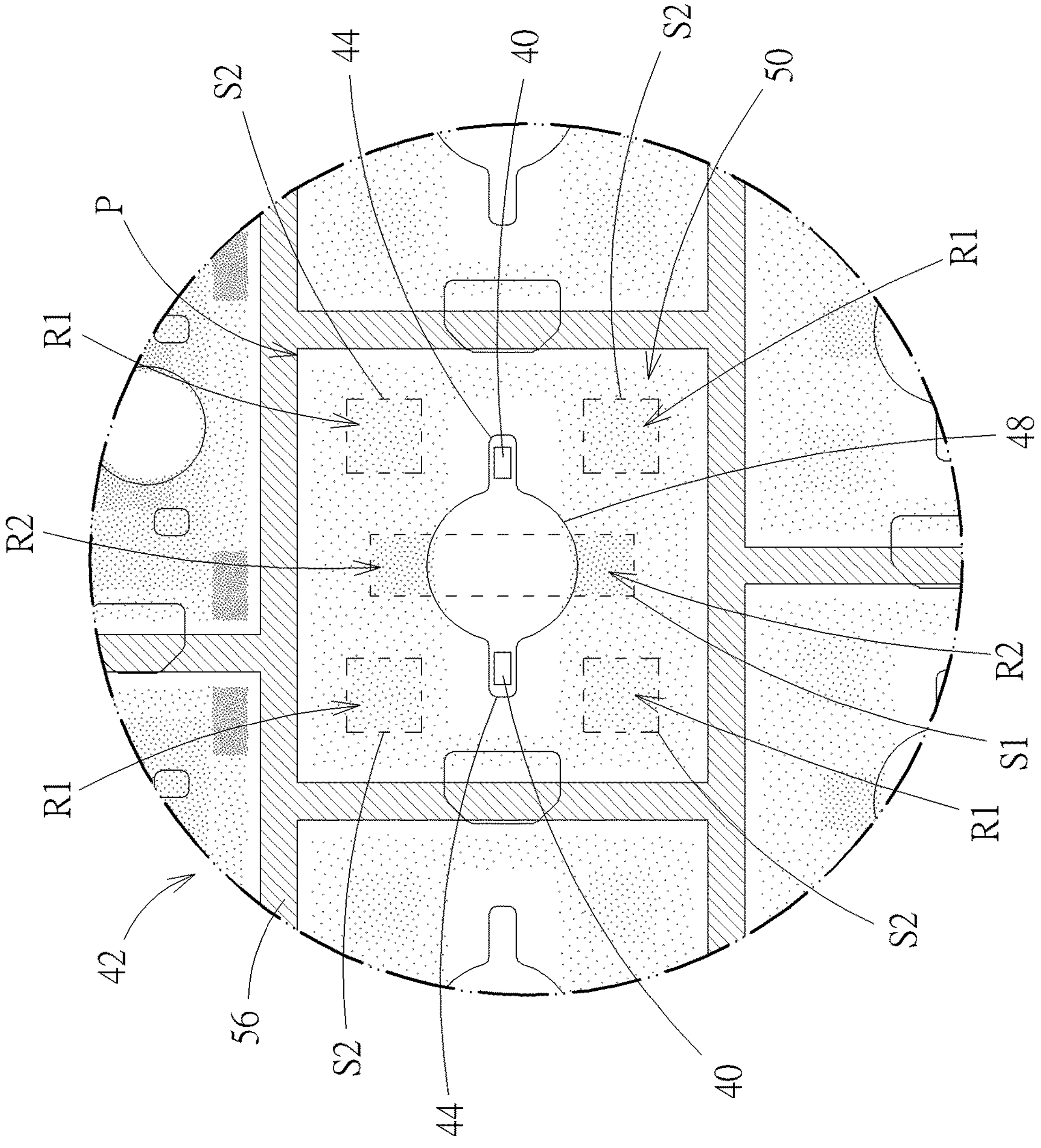
FIG. 4 is a partial enlarged perspective view of a light guide plate in FIG. 2.

It should be mentioned that the present invention could further adopt a backlight design. For example, please refer to FIG. 2, FIG. 3 and FIG. 4. FIG. 4 is a partial enlarged perspective view of a light guide plate 42 in FIG. 2. As shown in FIG. 2, FIG. 3 and FIG. 4, the membrane circuit board 16 could have at least one light emitting diode 40 disposed thereon corresponding to the keyswitch 12 (two light emitting diodes 40 disposed at two sides of the elastic member 22 respectively, but not limited thereto) for emitting light to the keycap 18, so as to generate the keyswitch lighting effect. In practical application, the keyboard 10 could further include the light guide plate 42 (the light guide plate 42 and the membrane circuit board 16 can form a backlight module 11 of the keyboard 10) disposed between the membrane circuit board 16 and the baseplate 14. The light guide plate 42 has a slot hole 44 corresponding to the light emitting diode 40 for containing the light emitting diode 40 and guides light of the light emitting diode 40 to be incident to the keycap 18. The baseplate 14 could preferably have an avoiding hole 46 corresponding to the light emitting diode 40 for containing the light emitting diode 40, so as to surely avoid the problem that the baseplate 14 interferes with the light emitting diode 40 to damage the light emitting diode 40. The light guide plate 42 could further have a second hole 48 corresponding to the elastic member 22, so that the elastic member 22 can pass through the first hole 24 and the second hole 48 to be disposed on the membrane circuit board 16. The second hole 48 with a larger area can be communicated with the slot hole 44 with a smaller area to be preferably in a keyhole shape (but not limited thereto).

In addition, for improving the light utilization efficiency of the light guide plate 42, the present invention can further adopt an optical microstructure design. For example, as shown in FIG. 2 and FIG. 4, an optical microstructure 50 could be formed on the light guide plate 42 and preferably adopt the micro lens design (but not limited thereto, meaning that the present invention could also adopt other optical scattering designs, such as metal/white paint design, concave-convex dot design, continuous linear microstructure design, etc.). In such a manner, the optical microstructure 50 can guide light in the light guide plate 42 to be incident to the corresponding symbol on the keycap 18 after passing through the baseplate 14, thereby generating a symbol lighting effect. Furthermore, for improve the lighting uniformity of the symbol on the keycap 18, the present invention could adopt a design that optical microstructures with different microstructure densities are formed in the light guide plate 42. For example, as shown in FIG. 4, the keycap 18 could have at least one center symbol S1 and at least one side symbol S2 (one center symbol S1 and four side symbols S2 depicted briefly by dashed boxes in FIG. 4, but the number and positions of the symbols are not limited thereto). The microstructure density of the optical microstructure 50 in a proximal region R1 close to the light emitting diode 40 and corresponding to the side symbol S2 could be preferably less than the microstructure density of the optical microstructure 50 in the distal region R2 away from the light emitting diode 40 and corresponding to the center symbol S1, but could be preferably greater than the microstructure density of the optical microstructure 50 in the remaining regions except the proximal region R1 and the distal region R2. Via the aforesaid microstructure configuration, light of the light-emitting diode 40 can be incident to the center symbol S1 and the side symbol S2 more evenly for solving the problem that the symbol on the keycap 18 close to the light emitting diode 40 is too bright but the symbol away from the light emitting diode 40 are not bright enough, so as to generate the uniform lighting effect of the symbols on the keycap 18.

Figure 5:
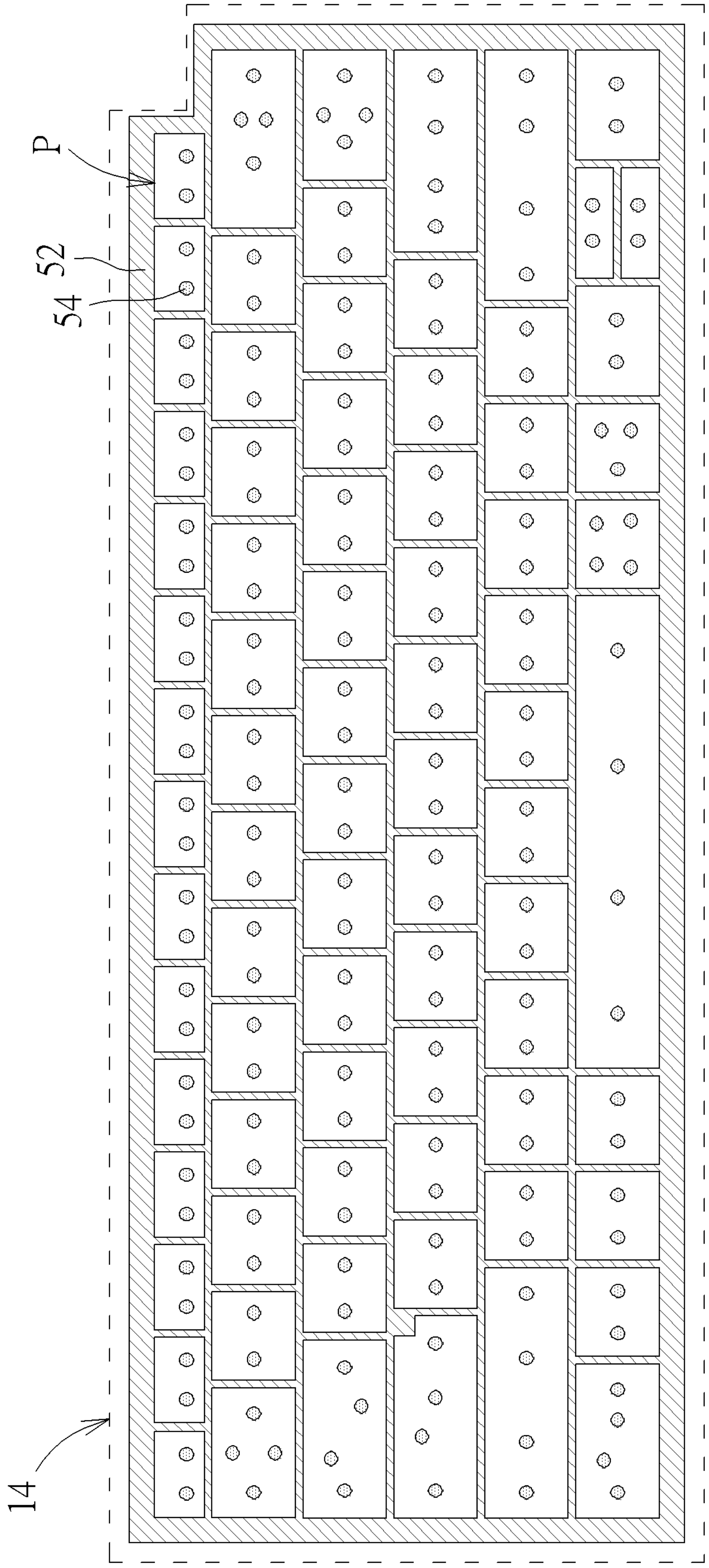
FIG. 5 is a diagram of an ink layer configuration of the baseplate in FIG. 2.

In practical application, for further avoiding the problem that the symbol on the keycap 18 is too bright and the light leakage problem and improving the light utilization efficiency of the light emitting diode 40, the present invention could adopt the ink reflection design and the light blocking design. For example, please refer to FIG. 2 and FIG. 5. FIG. 5 is a diagram of the ink layer configuration of the baseplate 14 in FIG. 2. For clearly showing the ink layer configuration of the baseplate 14, the baseplate 14 is briefly depicted by a dashed box in FIG. 5. As shown in FIG. 2 and FIG. 5, the baseplate 14 could have a ridge-shaped ink layer 52 (made of opaque ink, such as black ink, but not limited thereto) formed along a projection contour P of each keyswitch 12 relative to the baseplate 14, and the baseplate 14 could have a reflective ink layer 54 formed above the light emitting diode 40. To be noted, the reflective ink design is not limited to the aforesaid embodiment. For example, the present invention could also adopt paint materials with highly reflective particles, even a metal layer or metal paint, wherein the reflective ink layer 54 needs to have a reflectivity of at least 15-20%, and the reflective ink layer 54 may also have a preferable light transmittance or absorption rate. Via the aforesaid configuration, the ridge-shaped ink layer 52 can prevent light passing through the baseplate 14 from being directly incident to the outside of the keyswitch 12 for generating the effect of preventing light leakage. On the other hand, the reflective ink layer 54 can reflect at least partial light emitting upward by the light emitting diode 40 back to the optical microstructure 50 in the light guide plate 42 as shown in FIG. 2. In such a manner, light in the light guide plate 42 can pass through the baseplate 14 via scattering of the optical microstructure 50 to be incident to the corresponding symbol on the keycap 18 for generating the symbol lighting effect, so as to solve the prior art problem that the symbol is too bright when light emitted upward by the light emitting diode is directly incident to the keyswitch. In such a manner, the brightness uniformity and the symbol lighting effect of the keyboard 10 can be improved greatly.

Figure 6:
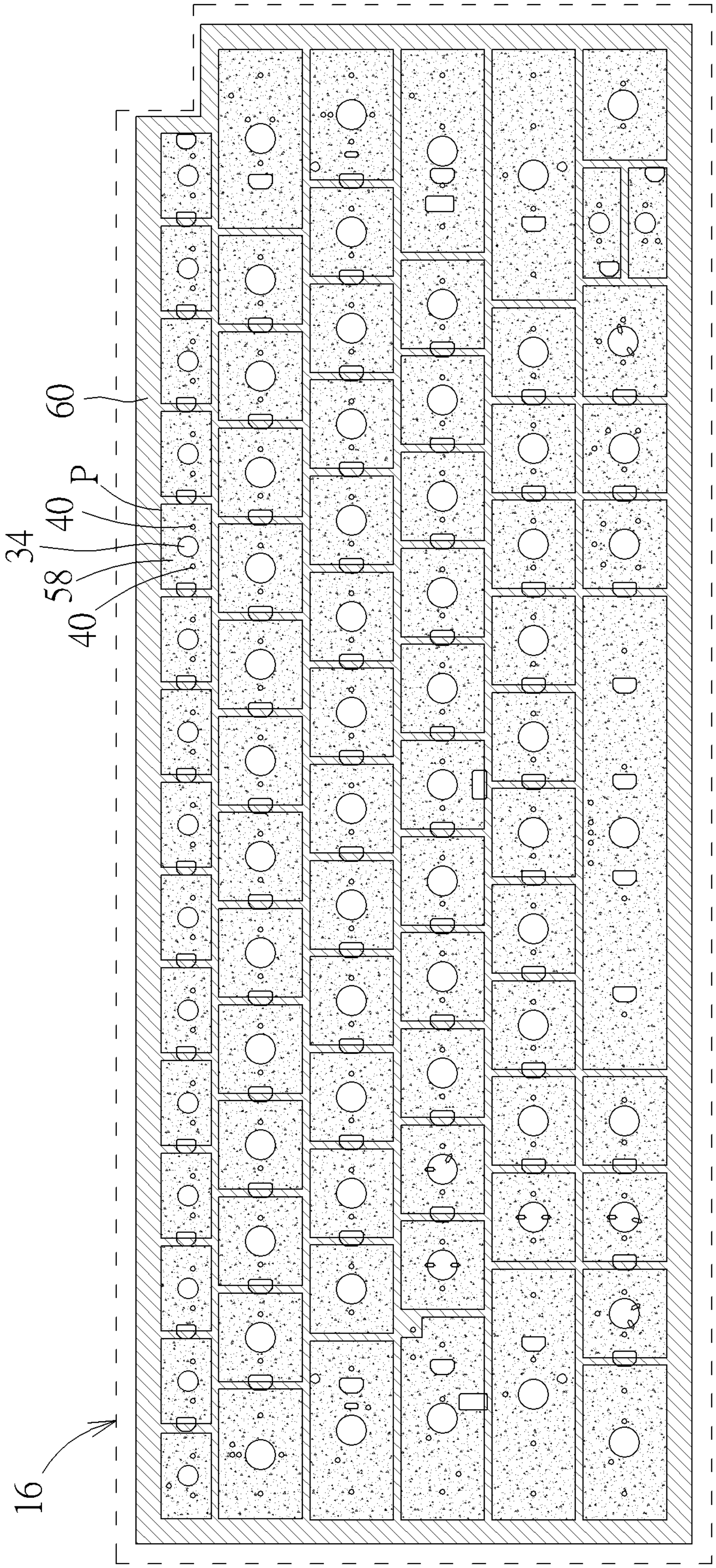
FIG. 6 is a diagram of the ink layer configuration of a membrane circuit board in FIG. 2.

To be noted, the aforesaid reflective and opaque ink layers could be selectively applied to the light guide plate 42 and the membrane circuit board 16. For example, please refer to FIG. 4 and FIG. 6. FIG. 6 is a diagram of the ink layer configuration of the membrane circuit board 16 in FIG. 2. For clearly showing the ink layer configuration on the membrane circuit board 16, the membrane circuit board 16 is briefly depicted by a dashed box in FIG. 6. As shown in FIG. 4, the light guide plate 42 could have a ridge-shaped ink layer 56 (made of opaque ink, such as black ink, but not limited thereto) formed along the projection contour P of each keyswitch 12 relative to the light guide plate 42 to prevent light passing through the light guide plate 42 from being directly incident to the outside of the keyswitch 12 for generating the effect of preventing light leakage. Furthermore, as shown in FIG. 6, the membrane circuit board 16 could have a reflective ink layer 58 (preferably a white ink layer, but not limited thereto) coated corresponding to each keyswitch 12, so that light emitted downward out of the light guide plate 42 can be reflected back to the light guide plate 42. The membrane circuit board 16 could have a ridge-shaped ink layer 60 (made of opaque ink, such as black ink, but not limited thereto) formed along the projection contour P of each keyswitch 12 relative to the membrane circuit board 16 to prevent light from passing through the membrane circuit board 16, so as to further enhance the light utilization efficiency of the light emitting diode 40 for the light guide plate 42.

Figure 7:
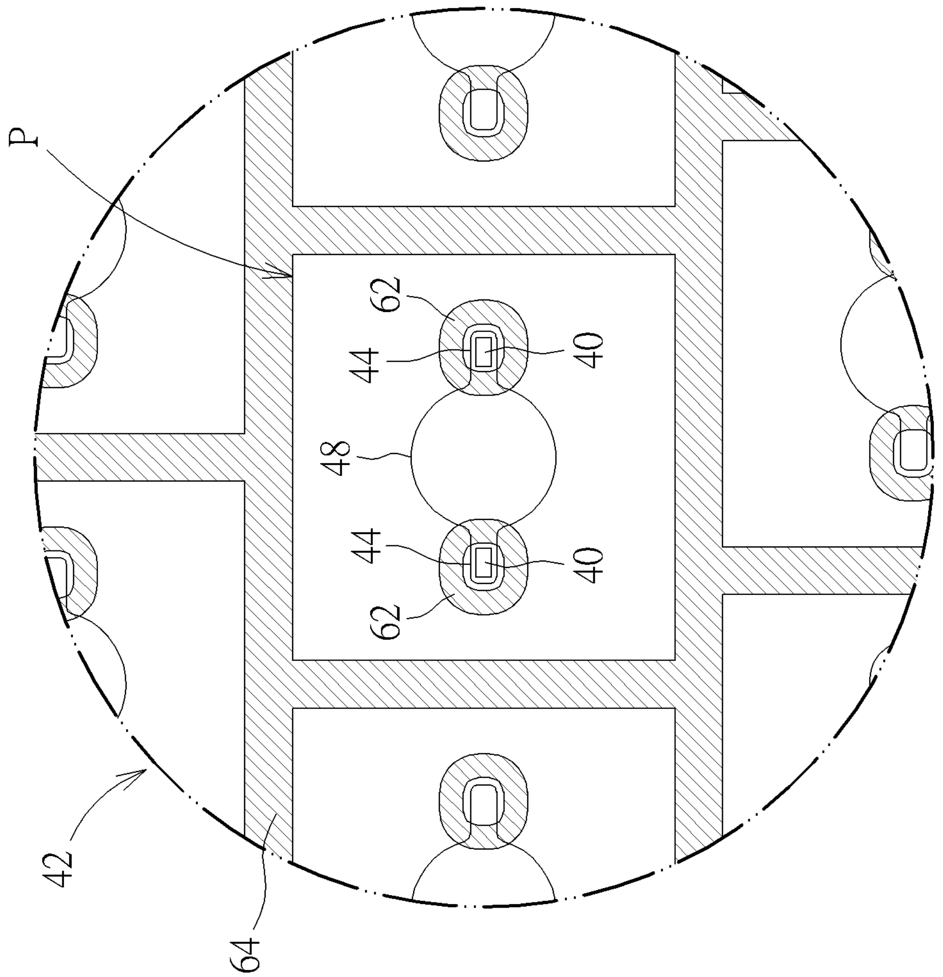
FIG. 7 is a partially enlarged top perspective view of an adhesive layer configuration of the light guide plate in FIG. 2.

Moreover, the present invention could further adopt the adhesive layer design. For example, please refer to FIG. 7, which is a partially enlarged top perspective view of the adhesive layer configuration of the light guide plate 42 in FIG. 2. As shown in FIG. 7, the backlight module 11 of the keyboard 10 could further include at least one ring-shaped adhesive layer 62 (two ring-shaped adhesive layers 60 respectively corresponding to two light emitting diodes 40 as shown in FIG. 7, but not limited thereto). The ring-shaped adhesive layer 62 could be disposed around the light emitting diode 40 and attached to a lower surface of the light guide plate 42 (or between the light guide plate 42 and the membrane circuit board 16), or the ring-shaped adhesive layer 62 could be disposed on an upper surface of the light guide plate 42 (or between the light guide plate 42 and the baseplate 14). The ring-shaped adhesive layer 62 can make the light emitting diode 40 and the light guide plate 42 attached to each other tightly for providing a preferable light coupling effect. Via the aforesaid adhesive layer design, light of the light emitting diode 40 can reach the medium at the other side of the ring-shaped adhesive layer 62 smoothly when the light is directly or indirectly incident to the ring-shaped adhesive layer 62 such that the light between the reflective ink layer 54 and the reflective ink layer 58 can be reflected back to the light guide plate 42, so as to avoid light dissipation and loss in the air gap between the light guide plate 42 and the baseplate 14 or another air gap between the light guide plate 42 and the membrane circuit board 16. As such, the present invention can ensure that a sufficient proportion of light can continue to be transmitted laterally to a far position in the light guide plate 42, thereby enhancing the lighting uniformity of the keyboard 10. In addition, as shown in FIG. 7, the backlight module 11 of the keyboard 10 could further include a fixing adhesive layer 64. The fixing adhesive layer 64 could be formed around the projection contour P of each keyswitch 12 on the light guide plate 42 to be ring-shaped. The fixing adhesive layer 64 could be attached on the lower surface of the light guide plate 42 (or between the light guide plate 42 and the membrane circuit board 16), or the fixing adhesive layer 62 could be disposed on the upper surface of the light guide plate 42 (or between the light guide plate 42 and the baseplate 14), so as to improve the fixed tightness between the light guide plate 42 and the baseplate 14 (or between the light guide plate 42 and the membrane circuit board 16). As such, the present invention can effectively prevent light leakage from the air gap between the light guide plate 42 and the baseplate 14 (or the air gap between the light guide plate 42 and the membrane circuit board 16) and improves the light coupling efficiency.

It should be mentioned that the plastic baseplate design, the actuating pillar design, the avoiding hole design, the hook design, the plastic keyboard design, and the LGP (light guide plate) hole design mentioned in the aforesaid embodiments can be implemented independently or selectively combined with each other, so as to improve the design flexibility of the keyboard of the present invention. For example, the present invention could only adopt the plastic baseplate design to improve the recyclability of the keyboard and be advantageous to the thinning design of the keyboard. As for the related description for the other derived embodiments (e.g., the embodiment in which the hook design is only adopted for improving the assembly and disassembly convenience and recyclability of the keyboard, the embodiment in which the LGP hole design is only adopted for containing the elastic member and the light emitting diode, etc.), it could be reasoned by analogy and omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyboard comprising:

a plurality of keyswitches, each keyswitch having a keycap, a lifting mechanism and an elastic member, the lifting mechanism being movably connected to the keycap, and the elastic member abutting against the keycap;

a plastic baseplate having a first hole formed corresponding to each elastic member and forming a connecting structure integrally corresponding to each lifting mechanism, wherein the connecting structure is movably connected to the lifting mechanism to make the keycap movable relative to the plastic baseplate; and a membrane circuit board disposed under the plastic baseplate, each elastic member passing through the first hole on the plastic baseplate to be disposed on the membrane circuit board, the membrane circuit board having at least one light emitting diode disposed corresponding to the keyswitch, the at least one light emitting diode being located on at least one side of the elastic member and emitting light to the keycap, and the plastic baseplate having an avoiding hole corresponding to the at least one light emitting diode for containing the at least one light emitting diode;

wherein when the keycap is pressed, the elastic member deforms downward to trigger the membrane circuit board;

when the keycap is released, the elastic member returns the keycap to its original position.

2. The keyboard of claim 1, wherein the membrane circuit board has a vent hole formed corresponding to the elastic member, and the vent hole discharges air in the elastic member when the keycap is pressed to deform the elastic member.

3. The keyboard of claim 1, wherein the keyboard further comprises a light guide plate, the light guide plate is disposed between the membrane circuit board and the plastic baseplate, the light guide plate has a slot hole corresponding to the at least one light emitting diode for containing the at least one light emitting diode and guides light of the light emitting diode to be incident to the keycap, the light guide plate has a second hole corresponding to the elastic member, and the elastic member passes through the first hole and the second hole to be disposed on the membrane circuit board.

4. The keyboard of claim 1, wherein the membrane circuit board has a switch contact corresponding to the elastic member, and the elastic member has an actuating pillar extending toward the switch contact;

wherein when the keycap is pressed, the elastic member deforms to drive the actuating pillar to trigger the switch contact.

5. The keyboard of claim 1, wherein a plurality of hooks extends downward from the plastic baseplate in an integral forming manner, and the plurality of hooks is engaged with a plurality of engaging hole structures formed on a holding baseplate of a computer device respectively, so as to make the keyboard detachably mounted on the computer device.

6. A keyboard comprising:

a plurality of keyswitches, each keyswitch having a keycap, a lifting mechanism and an elastic member, the lifting mechanism being movably connected to the keycap, and the elastic member abutting against the keycap;

a plastic baseplate having a first hole formed corresponding to each elastic member, wherein the lifting mechanism is movably connected to the plastic baseplate to make the keycap movable relative to the plastic baseplate; and a membrane circuit board disposed under the plastic baseplate and having a switch contact corresponding to each elastic member, each elastic member passing through the first hole on the plastic baseplate to be disposed on the membrane circuit board and having an actuating pillar extending toward the switch contact, the membrane circuit board having at least one light emitting diode disposed corresponding to the keyswitch, the at least one light emitting diode being located on at least one side of the elastic member and emitting light to the keycap, and the plastic baseplate having an avoiding hole corresponding to the at least one light emitting diode for containing the at least one light emitting diode;

wherein when the keycap is pressed, the elastic member deforms to drive the actuating pillar to trigger the switch contact;

when the keycap is released, the elastic member returns the keycap to its original position.

7. The keyboard of claim 6, wherein the membrane circuit board has a vent hole formed corresponding to the elastic member, and the vent hole discharges air in the elastic member when the keycap is pressed to deform the elastic member.

8. The keyboard of claim 6, wherein the keyboard further comprises a light guide plate, the light guide plate is disposed between the membrane circuit board and the plastic baseplate, the light guide plate has a slot hole corresponding to the at least one light emitting diode for containing the at least one light emitting diode and guides light of the light emitting diode to be incident to the keycap, the light guide plate has a second hole corresponding to the elastic member, and the elastic member passes through the first hole and the second hole to be disposed on the membrane circuit board.

9. The keyboard of claim 6, wherein a plurality of hooks extends downward from the plastic baseplate in an integral forming manner, and the plurality of hooks is engaged with a plurality of engaging hole structures formed on a holding baseplate of a computer device respectively, so as to make the keyboard detachably mounted on the computer device.

10. A keyboard comprising:

a plurality of keyswitches, each keyswitch having a keycap, a lifting mechanism and an elastic member, the lifting mechanism being movably connected to the keycap, and the elastic member abutting against the keycap;

a membrane circuit board having at least one light emitting diode corresponding to the keyswitch, the at least one light emitting diode being located on at least one side of the elastic member and emitting light to the keycap; and a plastic baseplate disposed on the membrane circuit board, the plastic baseplate having a first hole formed corresponding to the elastic member and having an avoiding hole corresponding to at least one light emitting diode for containing the at least one light emitting diode, wherein the elastic member passes through the first hole to be disposed on the membrane circuit board, and the lifting mechanism is movably connected to the plastic baseplate to make the keycap movable relative to the plastic baseplate;

wherein when the keycap is pressed, the elastic member deforms to trigger the membrane circuit board;

when the keycap is released, the elastic member returns the keycap to its original position.

11. The keyboard of claim 10, wherein the membrane circuit board has a vent hole formed corresponding to the elastic member, and the vent hole discharges air in the elastic member when the keycap is pressed to deform the elastic member.

12. The keyboard of claim 10, wherein the keyboard further comprises a light guide plate, the light guide plate is disposed between the membrane circuit board and the plastic baseplate, the light guide plate has a slot hole corresponding to the at least one light emitting diode for containing the at least one light emitting diode and guides light of the light emitting diode to be incident to the keycap, the light guide plate has a second hole corresponding to the elastic member, and the elastic member passes through the first hole and the second hole to be disposed on the membrane circuit board.

13. The keyboard of claim 12, wherein the keycap has at least one symbol formed thereon, and a light guide plate has a micro lens structure corresponding to the at least one symbol to guide light from the light guide plate to the at least one symbol.

14. The keyboard of claim 12, wherein a plurality of hooks extends downward from the plastic baseplate in an integral forming manner, and the plurality of hooks is engaged with a plurality of engaging hole structures formed on a holding baseplate of a computer device respectively, so as to make the keyboard detachably mounted on the computer device.

* * * * *